United States Patent [19]

Minohara et al.

[11] 4,117,487
[45] Sep. 26, 1978

[54] ELECTRONICALLY SCANNED ECHO PULSE RECEIVER

[75] Inventors: Kiyomi Minohara, Takarazuka; Akira Sugiyama, Ashiya, both of Japan

[73] Assignee: Furuno Electric Co., Ltd., Nagasaki, Japan

[21] Appl. No.: 787,823

[22] Filed: Apr. 15, 1977

[30] Foreign Application Priority Data

Apr. 15, 1976 [JP] Japan .................................. 51/43293
Jan. 27, 1977 [JP] Japan .................................. 52/8359

[51] Int. Cl.² .......................................... H01Q 3/26
[52] U.S. Cl. .............................................. 343/100 SA
[58] Field of Search ........................ 343/16 R, 100 SA

[56] References Cited

U.S. PATENT DOCUMENTS

| 3,202,992 | 8/1965 | Kent et al. | 343/100 SA |
| 3,238,528 | 3/1966 | Hines | 343/100 SA |
| 3,460,145 | 8/1969 | Johnson | 343/100 SA |
| 3,500,303 | 3/1970 | Johnson | 343/100 SA X |
| 3,600,701 | 8/1971 | Gouldthorpe | 343/100 SA X |
| 4,005,382 | 1/1977 | Beaver | 343/100 SA X |

Primary Examiner—T.H. Tubbesing
Attorney, Agent, or Firm—Sughrue, Rothwell, Mion, Zinn and Macpeak

[57] ABSTRACT

Scanning angle control for a linear array of spaced transducers in a pulse echo receiver is implemented by mixing the respective transducer outputs with progressively shifted output signals from a multi-stage, variable phase shifter fed by a local oscillator. The additively combined mixer outputs thus contain frequency sum and difference components, which are extracted by low or high pass filters to implement scanning control on either side of a perpendicular to the array. When a two dimensional array of transducers arranged in a row and column coordinate grid is employed, scanning in both azimuth and elevation may be implemented by coupling each column of transducer mixers to the respective phase shifter stages through digital delay circuits arranged in rows and fed by a variable frequency clock pulse generator, whereby progressive delays are provided in the columnar direction.

11 Claims, 4 Drawing Figures

ELECTRONICALLY SCANNED ECHO PULSE RECEIVER

BACKGROUND OF THE INVENTION

This invention relates to an electronically scanned sonar or a phased array radar wherein the angular orientation of a narrow reception beam may be controlled in either one or two dimensions.

When a plurality of ultrasonic receiving transducers are arranged on a straight line at a fixed spacing interval and are driven, at the same instant, an echo-pulse coming back from a target on a bearing which is perpendicular to the straight line of the transducers is received. Accordingly, a reception beam is formed having a directional orientation which is perpendicular to the line of transducers. An echo signal from a target having a bearing angle of $\theta$ relative to a perpendicular to the line of transducers is received by the first transducer before it reached the second, and so on. Thus, the echo signal received by each successive transducer is delayed relative to the previous one by an amount corresponding to the angle $\theta$. If a peak output is to be obtained for this particular angle of arrival, then a delay line is required to insert compensatory phase-shifts so that all of the components of the output signal are in phase, whereby their additive combination is maximized. Thus, the reception beam is formed for the particular angle $\theta$ and can be similarly formed in any direction. With the reception beam orientation thus formed and swept by a proper combination of stationary transducers and time delays, as opposed to a rotating transducer as used in a conventional sonar, the echo signals from targets lying in a predetermined sector are received and indicated on the screen of a cathode ray tube.

In order to control the angular direction of the reception beam, each transducer has been provided with a phase shifter having a plurality of delay circuit stages composed of inductors and capacitors so that required time delays are obtained. With such an arrangement, however, the signals received by the transducers deteriorate in the course of progressing through the stages of the delay circuits, and the signal reproduced at the output terminal of the phase shifter of the delay circuits often bears little resemblance in shape to the incoming signal. The received signal is also attenuated in the course of propagating through the stages of the delay circuits, and the degree of attenuation depends on the number of the stages as determined by the time delay required, which varies depending on the angle of incidence of the received beam. A complicated and costly circuit arrangement is necessary to compensate for such attenuation loss.

Another disadvantage is that each transducer is provided with a phase shifter having a plurality of delay circuit stages corresponding to the entire width of a sector over which the reception beam is swept, and with switching means to select the number of stages necessary to obtain a time delay corresponding to a required angle of incidence of the reception beam. Accordingly, the device becomes large and costly, the interconnections between the phase shifter and the switching means become complicated, and the adjustment of the phase shifters is troublesome since a number of shifting stages each having a large number of delay circuits must be installed.

SUMMARY OF THE INVENTION

Accordingly, an object of this invention is to provide am improved echo receiving system having a novel reception beam angle control device in which the phase-shift of the received signal is obtained by a heterodyne converter whose two inputs are respectively connected to a corresponding receiving transducer and to a local oscillator whose output signals are adjusted in phase, as opposed to a phase shifter having a plurality of delay circuit stages, thereby processing the received signal to any desired degree.

According to one aspect of the invention, the sonar or radar echo receiving system comprises a plurality of transducers arranged side by side in a line at fixed spacing intervals, a local oscillator generating a fixed frequency signal, a phase shifter (which may be digitally controlled) for shifting the output signal from the local oscillator, a plurality of mixers whose one inputs are respectively connected to the transducers and whose other inputs are connected to the phase shifter for mixing the respective received signals with phase-shifted output signals from the phase shifter, means for combining together all of the output signals from the mixers, and a low pass filter (or a high pass filter) for passing only the frequency difference components (or the frequency sum components) of the two frequencies fed to the mixers.

Another object of this invention is to provide an echo receiving system having a novel reception beam angle control device for varying the response angle of a two dimensional array of receiving transducers in either or both of two perpendicular directions, whereby full scanning control in both azimuth and elevation is implemented.

BRIEF DESCRIPTION OF THE DRAWINGS

In the drawings:

FIG. 1 shows a schematic block diagram of a transducer array signal processing circuit according to a first embodiment of the present invention, FIG. 4 shows a schematic block diagram of a phase angle control unit which may be used in the embodiments of FIGS. 1, 2 and 3.

DETAILED DESCRIPTION OF THE PREFERRED EMBODIMENTS

Figures 1, 4:
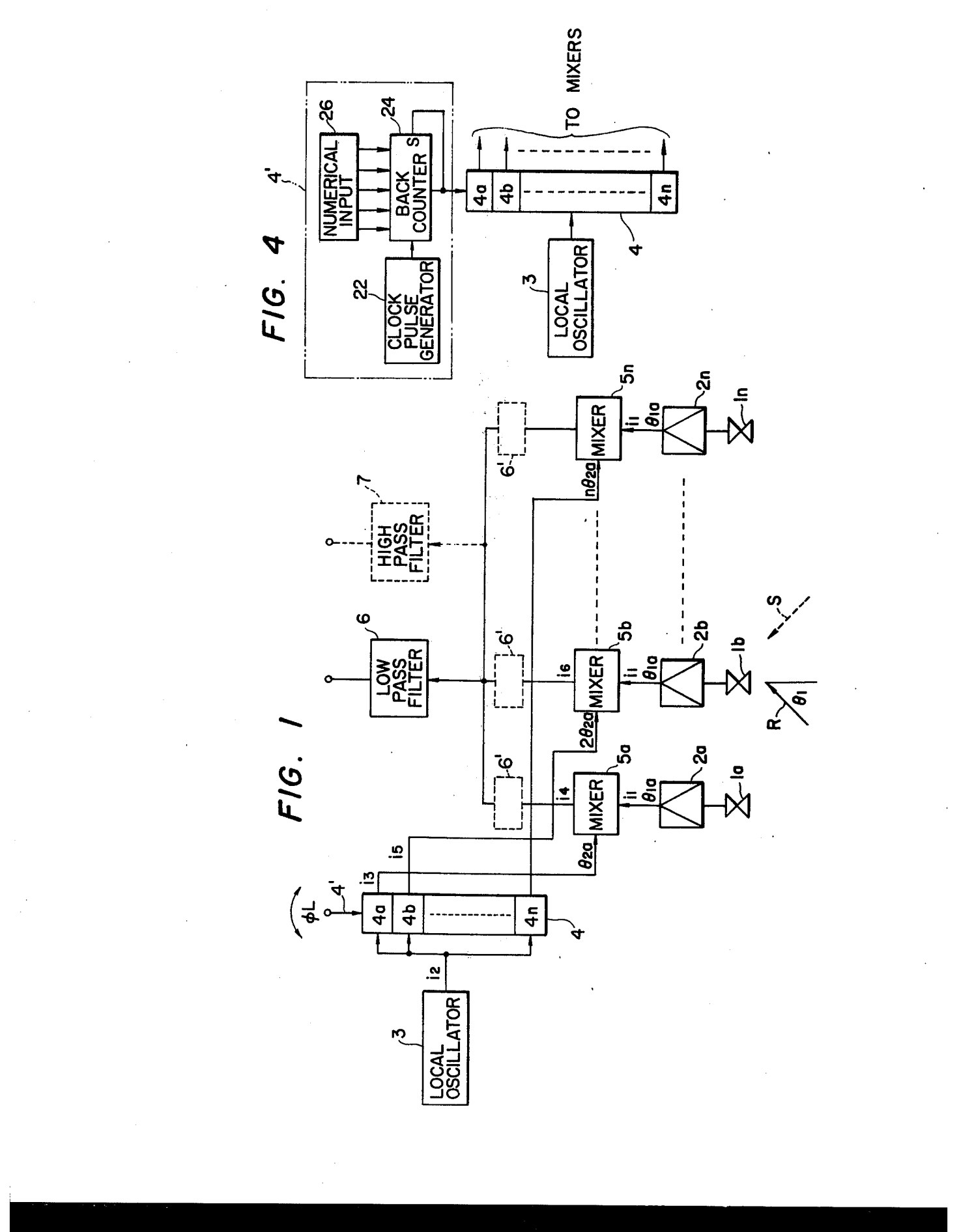
Figure 2:
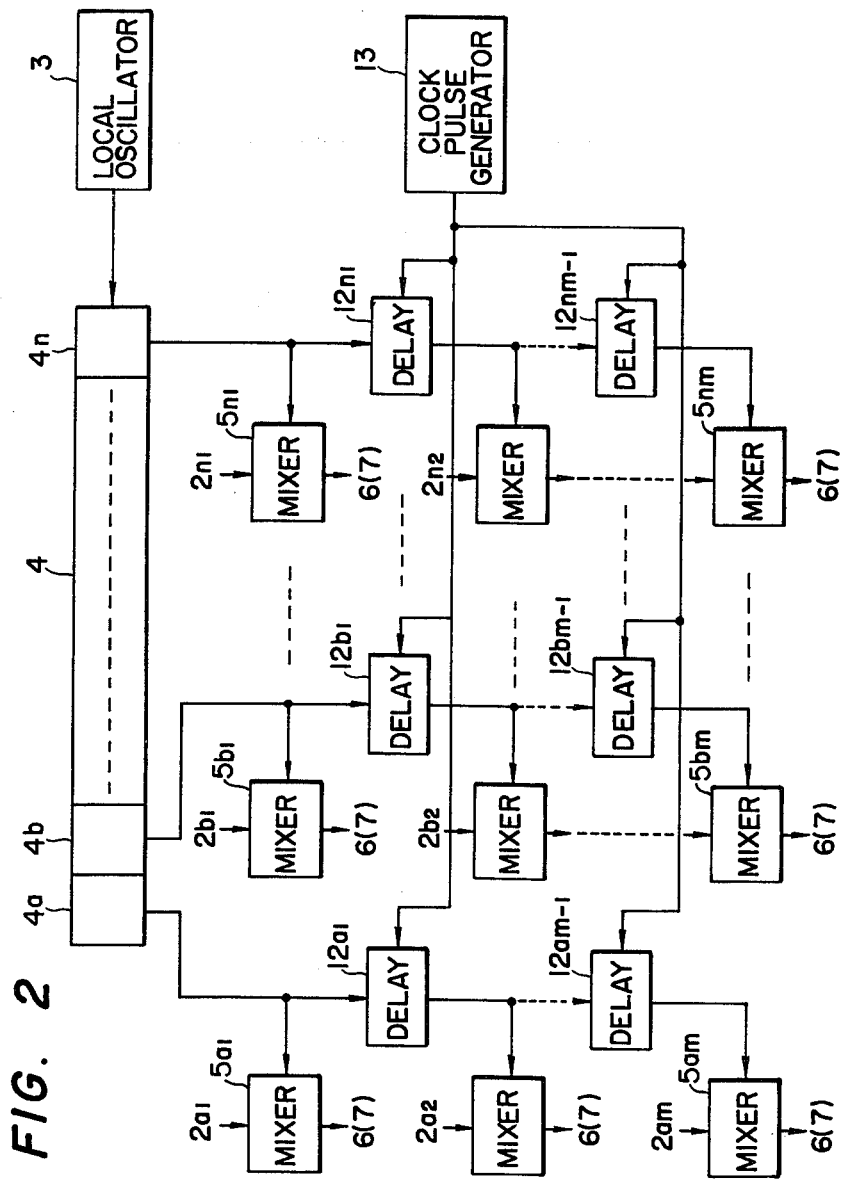
FIG. 2 shows a schematic block diagram of such a circuit according to a second embodiment of the invention.

Referring to FIG. 1, receiving transducers $1a, 1b, -1n$ are arranged side by side in a straight line array at fixed intervals, and the respective receiving surfaces of the transducers are oriented in the same direction. The inputs of amplifiers $2a, 2b, -2n$ are respectively connected to the outputs of the receiving transducers $1a, 1b, -1n$, and the amplifier outputs are respectively connected to one of the inputs of mixers $5a, 5b, -5n$. The other inputs of the mixers $5a, 5b, -5n$ are respectively connected to the corresponding output terminals of a phase shifter 4, and the mixer outputs are connected in common to the input of a low pass filter 6, or alternatively to a high pass filter 7, as shown in dashed line. The mixers $5a, 5b, -5n$ respectively combine the received signals with the output signals from the phase shifter 4 to produce output signals whose frequencies are equal to the sum and difference of the frequency of the received signal and the frequencies of the output signals from the phase shifter 4. A local oscillator 3 oscillates at a fixed frequency $f_2$, and its output is connected to the input of the phase shifter 4. The latter comprises phase shifting elements 4a, 4b,-4n whose outputs are respectively connected to the corresponding mixers. The phase shifting element 4a shifts the output signal from the local oscillator by an amount $\theta_{2a}$, the element 4b shifts the output signal by $2\theta_{2a}$, and likewise the elements 4c-4n respectively shift the signal by $3\theta_{2a}-n\theta_{2a}$. The low pass filter 6 passes only the frequency difference components of the output signals from the mixers 5a, 5b,-5n, and similarly the high pass filter 7 passes the frequency sum components thereof.

In operation, it is first assumed that an ultrasonic pulse wave of frequency $f_1$ is radiated in all directions from a transmitter (not shown) into the water, and echo signals from objects in the water are received by the receiving transducers 1a, 1b,-1n.

A reception signal $i_1$ received by the transducer 1a may be represented as follows:

$$i_1 = A \cos(\omega t + \theta_1 a),$$

where
A is the amplitude of the signal,
$\omega$ is $2\pi f_1$, and
$\theta_1 a$ is the phase angle.

This signal $i_1$, after amplification, is fed to one input of the mixer 5a.

The output signal $i_2$ of the local oscillator 3 is:

$$i_2 = B \cos\Omega t,$$

where
B is the amplitude, and
$\Omega$ is $2\pi f_2$.

The phase of this output signal $i_2$ is shifted by an amount $\theta_{2a}$ by the shifting element 4a, resulting in an output signal $i_3$ represented as follows:

$$i_3 = B \cos(\Omega t + \theta_{2a}).$$

The received signal $i_1$ is combined with the phase-shifted signal $i_3$ in the mixer 5a, and an output signal $i_4$ is produced thereby as represented below:

$$i_4 = AB\cos(\omega t + \theta_{1a})\cos(\Omega t + \theta_{2a}).$$

The above equation may be trigonometrically expanded as follows:

$$i_4 = AB\cos(\omega t + \theta_{1a})\cos(\Omega t + \theta_{2a}) =$$
$$\tfrac{1}{2}AB\cos\{(\omega-\Omega)t+(\theta_{1a}-\theta_{2a})\}+\tfrac{1}{2}AB\cos\{(\omega+\Omega)t+(\theta_{1a}\theta_{2a})\}.$$

The first term on the right represents the frequency difference component of the two frequencies fed to the mixer 5a, and the second term represents the frequency sum component thereof. The phase component in both the first and the second terms includes the phase angle $\theta_{2a}$, which is provided by the phase shifting element 4a. Thus, the phase of the output signal from the mixer 5a($\theta_{1a}-\theta_{2a}$, $\theta_{1a}+\theta_{2a}$) is determined by the value of $\theta_{2a}$.

In the same manner, the output signal $i_5$ from the phase shifting element 4b is:

$$i_5 = B\cos(\Omega t + 2\theta_{2a}),$$

as a result of the output signal of the local oscillator 3 being shifted an amount $2\theta_{2a}$, and the received signal $i_1$ is combined therewith in the mixer 5b, resulting in an output signal $i_6$ as follows:

$$i_6 = AB\cos(\omega t+\theta_{1a})\cos(\Omega t+2\theta_{2a}) = \tfrac{1}{2}AB\cos\{(\omega-\Omega)t+(\theta_{1a}-2\theta_{2a})\}+\tfrac{1}{2}AB\cos\{(\omega+\Omega)t+(\theta_{1a}+2\theta_{2a})\}.$$

Thus, the frequency difference component of the output signal $i_6$ has the phase term $(\theta_{1a}-2\theta_{2a})$, and likewise the frequency difference component of the output signal from the mixer 5n has the phase term $(\theta_{1a}-n\theta_{2a})$.

As may thus be seen, the phases of the respective output signals of the mixers 5a, 5b,-5n, in terms of the frequency difference component, are increased relative to the foregoing ones by the amount $\theta_{2a}$. When these frequency difference components of the mixer output signals are combined, a narrow reception or response beam as shown by the arrow R is formed at an angle $\theta_1$ (corresponding to the phase difference $\theta_{2a}$) relative to a perpendicular to the line of transducers. Accordingly, the reception beam can be oriented in any desired leftward direction when the value of $\theta_{2a}$ is appropriately varied by the phase shifter 4, as schematically shown by the phase angle control input 4'. Only received signals oriented in the direction of the reception beam formed as described above are passed through the low pass filter 6 and displayed on an output indicator (not shown).

In substantially the same manner, a reception beam as shown by the dotted arrow S is formed when the frequency sum components of the output signals from the mixers 5a, 5b-5n are combined together and passed through the high pass filter 7, since the phases of the frequency sum components of the respective mixer output signals are increased relative to the foregoing ones by the amount $\theta_{2a}$. The "frequency sum" reception beam can also be swept over its sector or quadrant by appropriately controlling the phase shifter 4.

As is apparent, the directions of the reception beams designated by the arrows R and S are symmetrical relative to the perpendicular to the line of transducers for a given setting of the phase shifter 4.

Accordingly, either one of the reception beams designated by arrows R and S can be obtained when one of the low or high pass filters is utilized, and both reception beams can be obtained when the low and high pass filters 6, 7 are driven at the same time, or when a branching filter is used.

Although in the above discussion, the reception beam is obtained by combining together the mixer output signals, it is possible to install the low or high pass filters so as to form the reception beam after the respective frequency sum or difference components are passed through the filters. For example, filter 6 in FIG. 1 could be replaced by a plurality of filters 6' shown in dotted outline.

The phase shifter 4 may comprise $k$ bit shift registers for successively shifting the phase of the oscillator signal, and the magnitude of the phase shift may be controlled by a phase angle control unit 4', which generates a train of clock pulses to drive the shift registers of the phase shifter. Referring to FIG. 4, the phase angle control unit 4' comprises a clock pulse generator 22, a backward counter 24, and a numerical input unit 26, which are interconnected such that the counter 24 decrements the clock pulses from the pulse generator 22 from a specific value preset by the numerical input unit 26. The counter 24 produces a pulse when its count becomes zero, and the output is fed back to the restoration terminal S and also connected to the input of the shift-register 4.

Referring now to FIG. 2, one input of each of the mixers [$5a_1$, $5b_1$,-$5n_1$], [$5a_2$, $5b_2$,-$5n_2$],-[$5am$, $5bm$,-$5nm$] is respectively connected to a transducer in a planar, horizontal, two dimensional array of receiving transducers arranged in $m$ rows and $n$ columns, namely transducers [$2a_1$, $2b_1$, -$2n_1$], [$2a_2$, $2b_2$, -$2n_2$], -[$2am$, $2bm$, -$2nm$], (not shown). The respective outputs of the mixers are all connected in common to the input of a filter 6 and/or 7 (not shown), as in FIG. 1. The other inputs of the mixers in the first row [$5a_1$, $5b_1$, -$5n_1$] are respectively connected to the outputs of the phase shifting elements 4a, 4b, -4n of the phase shifter 4, whose input is connected to the local oscillator 3. The other inputs of the mixers in the second row [$5a_2$, $5b_2$, - $5n_2$] are respectively connected to the outputs of the phase shifting elements 4a, 4b - 4n through delay circuits [$12a_1$, $12b_1$, - $12n_1$]. Likewise, the other inputs of the mixers in the third row [$5a_3$, $5b_3$, - $5n_3$] are respectively connected to the outputs of the phase shifter 4 through the delay circuits [$12a_1$, $12b_1$, - $12n_1$] and [$12a_2$, $12b_2$, - $12n_2$], and the other inputs of the mixers in the $m$-th row are respectively connected to the outputs of the phase shifter through the delay circuits [$12a_1$, $12b_1$, - $12n_1$], [$12a_2$, $12b_2$, - $12n_2$] - [$12am$-1, $12bm$-1, - $12nm$-1]. The delay circuits are of a well known type, such as $p$ bit shift-registers whose inputs are all connected in common to the output of a clock pulse generator 13, which produces a train of clock pulses having a frequency $f_3$ which may be controllably varied. The delay circuits in the first row [$12a_1$, $12b_1$, - $12n_1$] delay the output signals from the respective phase shifting elements by an amount $q$. The delay circuits in the second row [$12a_2$, $12b_2$, - $12n_2$] delay the output signals from the first row delay circuits by an additional amount $q$, with the result that the output signals from the phase shifter 4 are delayed by a total amount $2q$. In a similar manner, the output signals of the delay circuits in the ($m$-1)th row [$12am$-1, $12bm$-1, - $12nm$-1] are delayed by a total amount ($m$-1)$q$ relative to the output signal from the local oscillator 3. Filters (not shown) are provided between each delay circuit and mixer for converting the delay circuit output pulse waves into sine waves, which are respectively fed to the mixer inputs.

In operation, if it is first assumed that the respective phase shifting elements 4a-4n and the delay circuits 12 are all set to provide zero time delay to the output signals of both the local oscillator 3 and the phase shifter 4, whereby the output signals of the local oscillator 3 are directly fed to all of the mixers, a vertical reception beam perpendicular to the planar array is formed.

Now, if the delay circuits remain set to provide zero time delay to the respective output signals of the phase shifting elements 4a, 4b, - 4n and if the latter are controlled to delay the output signals of the local oscillator 3 by $\theta_{2a}$, $2\theta_{2a}$, - $n\theta_{2a}$ respectively, whereby the mixers in the first column $5a_1$, $5a_2$, - $5am$ are supplied with signals delayed by $\theta_{2a}$ relative to the output signal from the local oscillator, the mixers in the second column are supplied with signals delayed by $2\theta_{2a}$, and the mixers in the $n$-th column [$5n_1$, $5n_2$, - $5nm$] are supplied with signals delayed by $n\theta_{2a}$, a reception beam is formed having an orientation or deflection in the row direction of the array of $\theta_2$ (corresponding to a phase-shift of $\theta_{2a}$) relative to a perpendicular to the array. This reception beam can be formed at any desired angle within a range of 0° to 90°, and can be swept over its confining sector by varying the amount of phase shift provided by the elements of the phase shifter 4.

Conversely, when the phase shifting elements 4a, 4b, - 4n are set to pass the output signals from the local oscillator 3 without any time delays, the mixers in the first row [$5a_1$, $5b_1$, - $5n_1$] are directly supplied with the output signals from the local oscillator 3, the mixers in the second row [$5a_2$, $5b_2$, - $5bm$] are provided with signals delayed by an amount $q$ relative to the output signals from the oscillator 3, and the mixers in the $m$-th row [$5am$, $5bm$, - $5nm$] are provided with signals delayed by an amount ($m$-1)$q$, a reception beam is formed having an orientation or deflection in the column direction of the array of $\theta_3$ (corresponding to a time delay $q$) relative to a perpendicular to the transducer array. As will be easily understood, this reception beam may be swept over its confining sector or quadrant with a range of 0° to 90° by appropriately increasing the frequency of the clock pulse generator 13. By combining such columnar direction sweeping with row direction sweeping as described above, the reception beam response direction can thus be oriented in any desired direction (as to both azimuth and elevation) within a given two dimensional quadrant beneath the transducer array.

Further, if the outputs of the phase shifting element 4a, 4b, - 4n are respectively connected to the inputs of the mixers in the $m$-th row [$5am$, $5bm$, - $5nm$] and to the inputs of the delay circuits in the ($m$-1)th row, which can easily be accomplished with only minor modification of the circuit connections, the beam direction can be swept in the column direction over the adjacent sector, i.e., from 0° to —90°, by increasing the time delay.

Accordingly, the reception beam can be oriented in any desired direction in both azimuth and elevation by properly choosing the position of the transducer array, the use of the low or high pass filter to implement complementary sweeping over a full 180° in a first direction, and the interconnections between the phase shifter and the delay circuits to implement complimentary sweeping over a full 180° in a second direction normal to the first direction.

Figure 3:
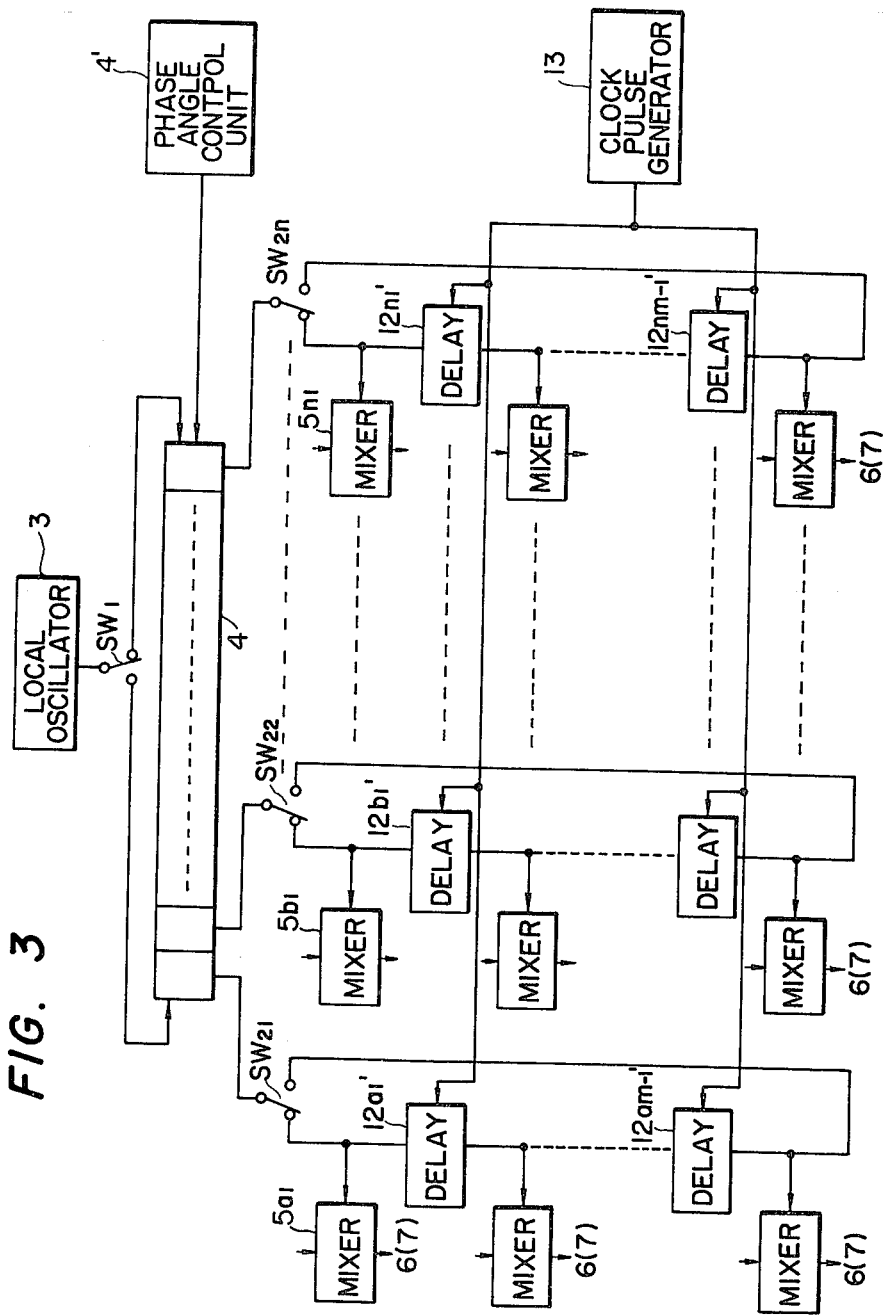
FIG. 3 shows a schematic block diagram of such a circuit according to a third embodiment of the invention.

Referring now to FIG. 3, the output of the local oscillator 3 is connected to either the right-hand input or the left-hand input of the shift register 4 through a switch SW1. When the switch SW1 is set as shown, the output signal of the local oscillator 3 is supplied to the right-hand input of the shift register 4 and is propagated therethrough from right to left. Conversely, when the switch SW1 is switched to the left, the output signal from the local oscillator 3 is propagated from left to right through the shift register. The shift register 4 is driven by the train of clock pulses from the phase angle control unit 4'.

When the switches SW21, SW22, - SW2n are set as shown, the outputs of the phase shifting elements 4a, 4b, - 4n are respectively connected to the inputs of the mixers $5a1$, $5b1$,- $5n1$ and the delay circuits $12a1'$, $12b1'$,- $12n1'$. The output signals from the respective phase shifting elements are thus propagated from the top to the bottom in FIG. 3. Conversely, when the switches SW21, SW22, - SW2n are transferred to the right, the outputs of the phase shifting elements are respectively connected to the inputs of the mixers $5am$, $5bm$, – $5nm$ and the delay circuits $12am-1'$, $12bm-1'$, – $12nm-1'$, whereby output signals from the respective phase shifting elements are propagated from the bottom to the top of the circuit array. The interconnection between the mixers, delay circuits between the mixers and the delay circuits, between the mixers clock pulse generator 13, etc., are the same as shown in FIG. 2.

As is apparent, the reception beam can thus be oriented in any desired direction in both azimuth and elevation by properly operating the switch SW1 and the ganged or coupled switches SW21, SW22, – SW2n.

Although in the above discussion it has been assumed that the receiving transducers are arranged in a straight line (FIG. 1) or that the fixed array is a planar array (FIG. 2), this is not necessarily the case. It is possible for example, by inserting preselected fixed phase delays in the reception signals received by the transducers in a non-linear or non-planar arrangement, to produce a virtual linear arrangement of the transducers or a virtual planar array.

As described, above, according to this invention the reception beam orientation may be formed and swept, without deteriorating or degrading the received signals by intermediate processing, by using heterodyne convertors which are provided with the received signals and the output signals of a local oscillator to produce signals in which there are two frequency components whose phases are shifted by an amount determined and easily controlled by a variable phase shifter. Further, two dimensional scanning in a planar array may be easily implemented by incorporating a plurality of delay circuits, arranged in a coordinate grid and controlled by a variable frequency clock pulse generator.

What is claimed is:

1. A reception beam directional control system for varying the relative phases of the output signals produced by at least a pair of pulse echo receiving transducers spaced apart at a fixed interval, for combining such phase-shifted signals to obtain a reception beam, and for electronically controlling the directional orientation thereof, comprising:
   a. a local oscillator,
   b. a plurality of variable phase shifters corresponding to the number of said receiving transducers for progressively shifting the phase of the output signal of said local oscillator,
   c. a plurality of mixers for respectively modulating the received signals produced by said transducers with the output signals from said phase shifters,
   d. means for combining together the output signals from said plurality of mixers, and
   e. means for selecting at least one of the sideband frequencies of the combined output signals from said mixers.

2. A reception beam directional control system as defined in claim 1, wherein the selecting means comprises a low pass filter and a high pass filter selectively connected to the output of the combining means.

3. A reception beam directional control system as defined in claim 1, wherein the selecting means comprises a plurality of low pass filters and high pass filters selectively and individually connected between the mixer outputs and the combining means.

4. A reception beam directional control system as defined in claim 2, further comprising means for controlling the amount of phase shift produced by each of said phase shifters.

5. A two dimensional reception beam directional control system for a plurality of pulse echo receiving transducers arranged in an array of $m$ rows and $n$ columns, comprising:
   a. a local oscillator,
   b. $n$ variable phase shifters for progressively shifting the phase of the output signals of said local oscillator,
   c. $n \times (m-1)$ variable delay circuits arranged in $m-1$ rows and $n$ columns, each delay circuit providing the same amount of signal delay,
   d. means progressively connecting the delay circuits in each column such that the output of each delay circuit is connected to the input of the delay circuit immediately below it,
   e. $m \times n$ mixers,
   f. means respectively and individually connecting one of said mixer inputs to said transducer outputs,
   g. means respectively and individually connecting said phase shifter outputs to the other inputs of said mixers in the first row and to the inputs of the first row of delay circuits,
   h. means progressively and individually connecting the outputs of the delay circuits in each column to the other inputs of the second through the $m$th mixers in each column,
   i. means for combining together the output signals from said plurality of mixers, and
   j. means for selecting at least one of the sideband frequencies of the combined output signals from said mixers, whereby said reception beam direction may be controlled in both azimuth and elevation relative to a perpendicular to said array by varying said phase shifters and said delay circuits.

6. A reception beam direction control system as defined in claim 5, wherein the delay circuits are digitally controlled, and further comprising a variable frequency clock pulse generator commonly connected to each delay circuit for controlling the amount of delay provided thereby.

7. A reception beam directional control system as defined in claim 6, further comprising means for controlling the amount of phase shift produced by each of said phase shifters.

8. A reception beam directional control system as defined in claim 7, wherein said transducers are arranged in a planar array.

9. A reception beam directional control system as defined in claim 8, wherein the selecting means comprises a low pass filter and a high pass filter selectively connected to the output of the combining means.

10. A reception beam directional control system as defined in claim 8, wherein the selecting means comprises a plurality of low pass filters and high pass filters selectively and individually connected between the mixer outputs and the combining means.

11. A reception beam directional control system as defined in claim 8, further comprising switching means for transferring the interconnections from the phase shifters to the first row of mixers and delay circuits to the last row of mixers and delay circuits, and for reversing the progressive connections between the delay circuits in each column whereby the output of each delay circuit is connected to the input of the delay circuit immediately above it.

* * * * *